March 17, 1959  V. E. MARK  2,878,088
SUPPORT PROVIDING CONCEALED STORAGE
Filed March 11, 1957  4 Sheets-Sheet 2
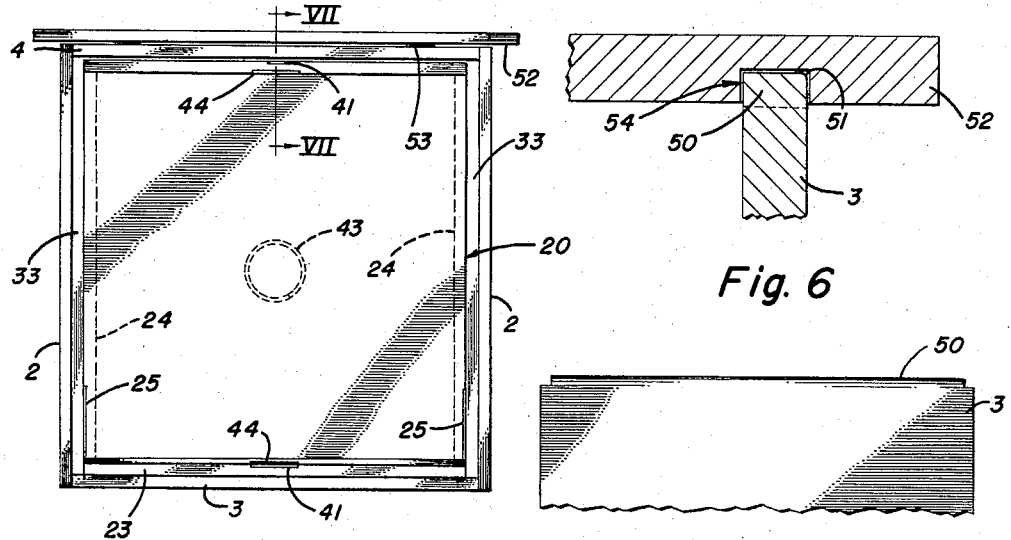
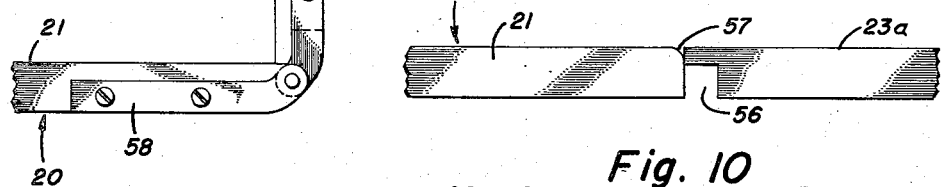
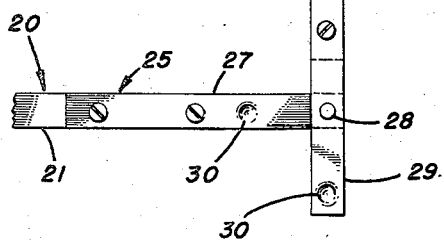
INVENTOR.
Vennice E. Mark
BY
ATTORNEYS

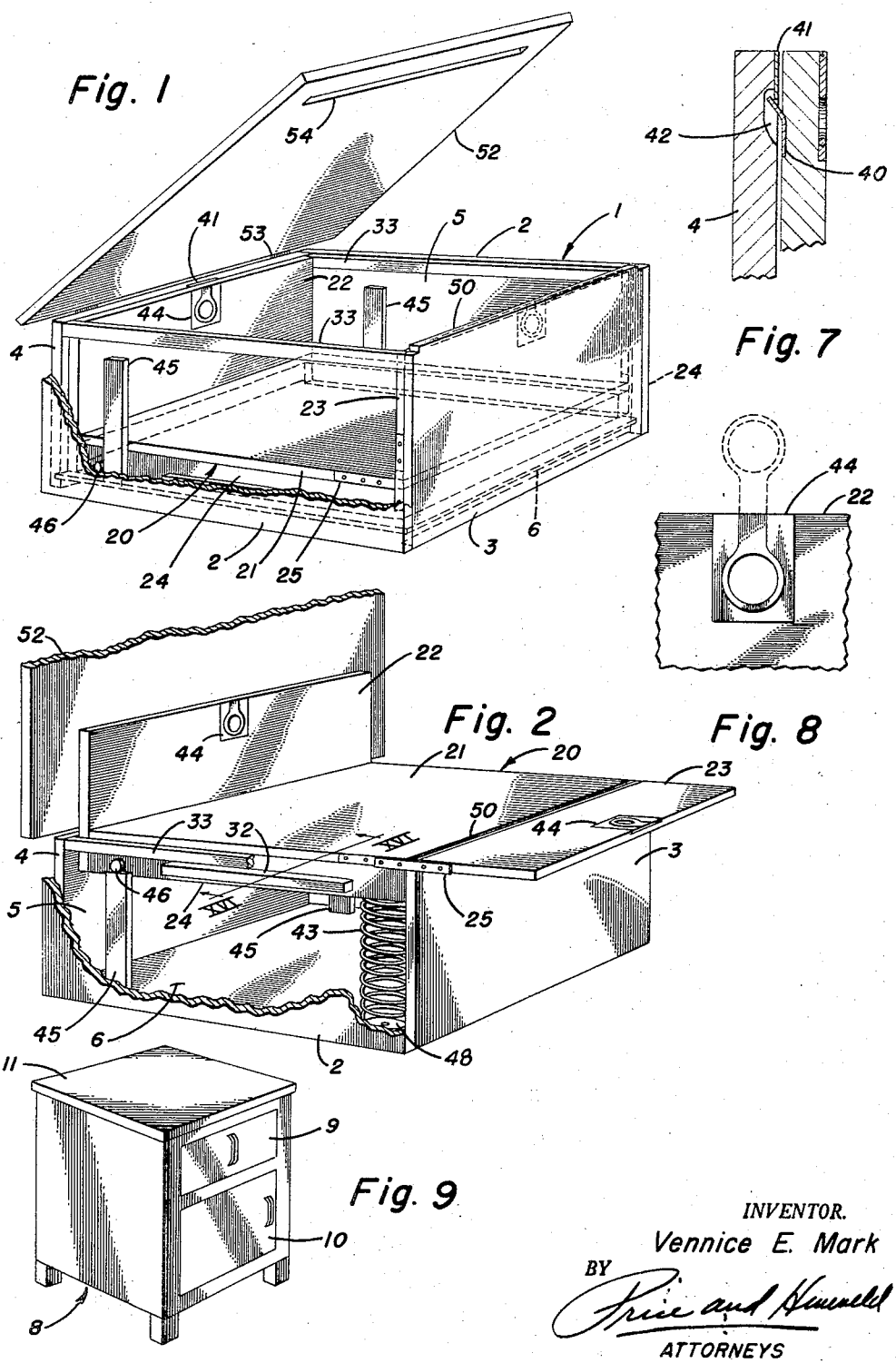

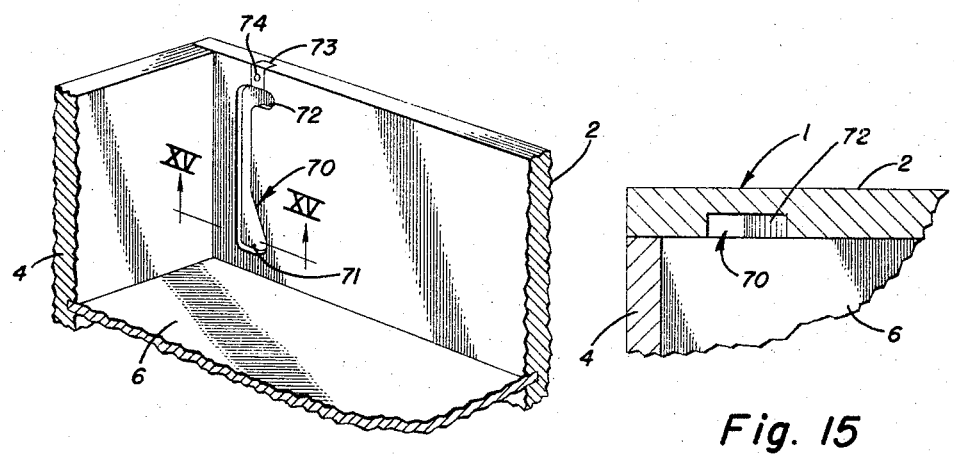
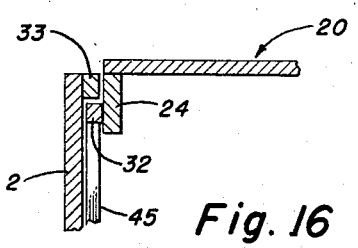

March 17, 1959   V. E. MARK   2,878,088
SUPPORT PROVIDING CONCEALED STORAGE
Filed March 11, 1957   4 Sheets-Sheet 4

INVENTOR.
Vennice E. Mark
BY
ATTORNEYS

United States Patent Office 2,878,088
Patented Mar. 17, 1959

2,878,088

SUPPORT PROVIDING CONCEALED STORAGE

Vennice E. Mark, East Grand Rapids, Mich.

Application March 11, 1957, Serial No. 645,238

11 Claims. (Cl. 312—29)

This invention relates to furniture and more particularly to a combination support and concealed storage means for a typewriter or other equipment.

While this invention may be used in an office or other business establishment, it is specifically intended to provide a neat, convenient and compact office equipment support for home use. It provides a combination table to support a machine such as a typewriter while in use and concealed storage for it when not in use. It has the additional advantage of providing both of these facilities without requiring the machine to be removed from the unit.

This invention permits various types of furniture to be used as a combination stand and storage facility. For example, it may be incorporated in a desk, an end table, a night stand, a telephone stand, or cabinets of any nature. The nature of the invention is such that the dual purpose of the furniture is entirely camouflaged.

This invention provides a firm support for the machine which will withstand the vibration incident to the use of office equipment. Yet it requires minimum effort on the operator's part to raise and lower the equipment. Its simplicity assures freedom from mechanical difficulty and durability in operation.

This invention solves the problem of using such equipment as typewriters in the home. Heretofore, the only facilities adapted for home use were stands providing, at best, exposed storage. The only other available storage facilities were either cupboards or drawers. These require the machine to be moved from its place of storage to its place of use at the beginning and end of each use. This invention solves these problems.

These and other advantages of this invention will be immediately recognized by those skilled in the design and manufacture of furniture upon reading the following specification and the accompanying drawings.

In the drawings:

Fig. 1 is an isometric view of the invention with one side partially broken out to expose the interior of the housing, showing the equipment supporting platform in storage position.

Fig. 2 is an isometric view of the invention with one side partially broken out to expose the interior of the housing with the equipment supporting platform in raised or operating position.

Fig. 3 is a plan view of the invention with the equipment supporting platform in storage position.

Fig. 4 is an enlarged, fragmentary view of the hinge structure for the platform with the platform in raised or folded position.

Fig. 5 is a fragmentary, front elevation view of the front panel of the housing.

Fig. 6 is an enlarged, fragmentary, sectional view of the cover, closed upon the front panel of the housing.

Fig. 7 is a fragmentary, enlarged, sectional, elevation view taken along the plane VII—VII of Fig. 3.

Fig. 8 is an enlarged, fragmentary view of a typical handle for manipulating the platform.

Fig. 9 is an isometric view of a typical piece of furniture incorporating this invention.

Fig. 10 is an enlarged, sectional view of a modified design for the joint between the main and leaf portions of the platform.

Fig. 11 is an enlarged, fragmentary view of the joint shown in Fig. 10 but showing the hinge used at the joint.

Fig. 12 is an enlarged, fragmentary view of the joint shown in Fig. 10 illustrating the platform in folded position.

Fig. 13 is a fragmentary, enlarged, plan view of the joint illustrated in Fig. 10.

Fig. 14 is a fragmentary, isometric view of a modified construction for the platform's rear support.

Fig. 15 is a fragmentary sectional view taken along the plane XV—XV of Fig. 14.

Fig. 16 is a fragmentary sectional elevation view taken along the plane XVI—XVI of Fig. 2.

Figure 17:
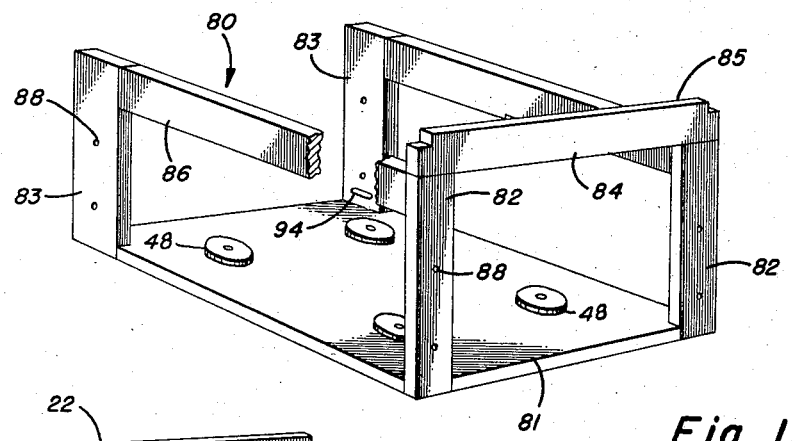
Fig. 17 is an oblique view of a framework for mounting the platform.

Referring specifically to the drawings, the numeral 1 indicates a housing having side panels 2, a front panel 3 and a rear panel 4. The housing is open at the top and contains a storage chamber 5 closed at its lower end by a floor or bottom 6.

The housing 1 may be a separate unit within itself or it may be an integral part of a larger piece of furniture such as a desk, end table, cabinet, corner table, night stand or cupboard. This is illustrated by the night stand 8 (Fig. 9) in which the storage compartment is concealed behind the dummy drawer front 9 while the lower portion of the night stand behind the door 10 retains its traditional structure and function. Access to the storage compartment is obtained by raising the hinged top 11. The integration of this invention into various pieces of furniture does not change it but rather serves the purpose of blending it into its surroundings and of concealing its true purpose.

To facilitate and simplify the understanding and description of this invention, it is illustrated as a separate unit. It should, however, be considered that the housing described in the following specification and illustrated in the several figures may constitute an integral part of a larger piece of furniture.

Associated with the housing is a platform 20 consisting of a main portion 21, a back board 22 and a front leaf 23. Projecting from the bottom of the platform are a pair of legs 24 closely adjacent to and paralleling each of the sides of the main portion 21. The back board 22 is arranged vertically and is permanently secured to the platform 20 by attachment to both the main portion 21 and the legs 24. The height of the back board 22 is such that when the platform is seated within the storage chamber 5 its upper end is either flush or slightly below the top of the housing 1.

The front leaf 23 is pivotally attached to the platform's main portion 21 by hinges 25 (Figs. 1, 2 and 4). The hinges 25 are arranged one on each side of the platform. Each consists of a pair of bars 26 and 27 (Fig. 4). The bar 26 is secured to the front leaf 23 and the bar 27 is secured to the main portion 21. The bars 26 and 27 are pivotally secured by a pin 28 located adjacent the end of the bar 27 and inwardly from one end of the bar 26. Thus, the bar 26 has a free end 29 which, when the bars are aligned, is detachably locked to the bar 27 by a detent 30.

The front leaf 23 is so attached to the bar 26 that, when the bars of the hinge 25 are aligned, the inward end of the leaf 23 is spaced from the outer end of the platform's main portion 21 a distance equal to the thickness of the front wall 3 of the housing. The purpose of this will appear more fully hereinafter.

The legs 24 are, throughout a portion of their length, provided with an outwardly projecting stop shoe 32 (Fig. 16). These cooperate with the stop bar 33 mounted to the sides 2 of the housing 1. The stop bar 33 is mounted flush with the top of the housing and is of such depth that the pin 46 may ride between it and the top of the post 45 and be raised sufficiently above the post 45 to permit the front leaf 23 to be seated over the ridge 50. The stop shoes 32 extend along the legs 24 a portion of the distance between the posts 45 and the front panel 3. The stop shoes 32 contact the stop bars 33 when the platform is elevated sufficiently to seat the leaf 23 over the ridge 50. Thus, when the platform 20 is seated in working position a gap exists between the stop bars and the stop shoes.

The platform is provided with means for holding it down in storage position. This means consists of a latch 40 secured to the back surface of the back board 22 and the lower surface of the front leaf 23 (Fig. 7). Each of the latches 40 cooperates with a keeper plate 41. One of the keeper plates is mounted on the back panel 4 and the other is mounted on the front panel 3 of the housing. A suitable pocket 42 is provided behind each of the keeper plates 41 to provide clearance and access for the latch plate 40.

When the platform is in storage position, that is, depressed fully into the storage chamber 5, the latches and keeper plates are positively held in engagement by the biasing effect of the spring 43. The spring 43 is mounted at the center of the platform and has one end bearing against the under surface of the platform and the other end bearing against the floor 6.

To prevent the ends of the spring from moving laterally, they are preferably stabilized by a disc shaped block 48 at each end. The blocks 48 are secured to the adjacent structure. The spring seats closely about the blocks.

The platform's stability, as it is being manipulated can be increased by the use of a plurality of springs 48 such as one at each corner of the platform. In this case, each spring will be weaker and their combined strengths will approximate that of the single spring 48, illustrated. Preferably, the strength of the spring is such that it will lift the combined weights of the platform 20 and of the equipment placed upon it substantially to the top of the housing whereby an operator has to exert a minimum of effort to raise and lower the platform. It will be recognized that any other suitable biasing means may be used to replace the particular spring illustrated.

To facilitate manipulation of the platform 20, it is provided with handles 44. These may be of any suitable type but, preferably, are of a type adapted to fold flush with the surface of the platform when not in use, such as illustrated in Fig. 8.

To support the rear of the platform when raised, a pair of posts 45 is provided. The posts 45 are secured to the side walls 2 of the housing and terminate short of the top of the housing. For cooperation with the posts 45, the platform is equipped with a pair of pins 46, one mounted to each of the legs 24. In raised position, the pins 46 rest on the tops of the posts 45 but when the platform is in storage and while being manipulated vertically within the storage chamber 5, the pins 46 are behind the posts 45. The width of the platform 20 is such that it fits snugly but slidably between the posts 45.

The front wall 3 of the housing 1 has an upstanding ridge 50. The height of the ridge is such that when the platform is seated over it, the top of the ridge is flush with the top surface of the platform. The length of the ridge 50 is such that it just snugly fits between the hinges 25. This arrangement locks the platform against horizontal movement in any direction when the platform is in raised position. The forward edge of the ridge is slightly radiused at 51 (Fig. 6) to facilitate the seating and the removal of the platform.

The top of the housing 1 is closed by a cover 52 secured by hinges 53 to the back panel 4 of the housing. Since the ridge 50 projects above the top of the housing, the cover 52 is provided with a slot 54 to receive it (Figs. 1 and 4). The slot 54 does not project through the cover and, thus, when the cover is closed, the ridge 50 is entirely concealed.

The various components making up the platform and the housing except the hinges, springs, latches and handles can be fabricated from any suitable material. It will be recognized that the components can be finished in any manner which is considered desirable.

Modifications

Figs. 10 through 13 illustrate a modified construction for the joint between the front leaf 23 and the main portion 21 of the platform 20. This modification provides a construction in which the top of the front wall is concealed when the platform 20 is opened. To effect this, the front leaf 23a is provided with a notch 56 partially through the leaf where it abuts the main portion 21 (Fig. 11). The width of the notch 56 is such that it will receive the ridge 50a and the ridge is correspondingly reduced in height to seat against the upper wall of the notch 56. As so constructed, the platform is level when the pins 46 are seated at the top of the posts 45. To permit the leaf 23a to be pivoted to storage position, the front end of the main portion 21 is slightly raised at 57 (Fig. 11) to prevent interference. This radius is made as small as possible to minimize the size of the depression thus created in the top surface of the platform.

To the end of maintaining a minimum radius on the ridge 50a, it is preferable to employ a different type of hinge with the notch 56. This hinge consists of a pair of arms 58 each having an upturned end 59. The ends 59 are overlapped and are joined by a pin 60. The hinges are narrower than the platform and are seated adjacent the bottom of the platform with the tops of the upturned arms flush with the top of the platform. This permits the pivot point of the hinge to be just below the surface of the platform. Thus, a minimum of interference will occur between the leaf and the platform's main portion when the leaf 23a is pivoted from horizontal to vertical position.

Figs. 14 and 15 illustrate a different modification of this invention. It is entirely possible to eliminate the posts 45. The advantage of doing this as it permits the platform to be widened to just slidably seat within the storage chamber 5, thus, greatly increasing the stability of the platform, since it will be supported along its entire length against rocking or side motion.

This is accomplished by providing slots 70 in the side walls 2 of the housing to receive the pins 46. The slots 70 have an enlarged lower end 71 to permit the horizontal travel of the pin necessary to release the platform from its locked storage position. This movement will be explained fully under "Operation." The upper part of each of the slots 70 has a horizontal extension 72 permitting the platform to travel forwardly after it has reached the top of the housing. This is necessary to place the platform in position to seat over the ridge 50 of the front wall. The horizontal extension 72 should be higher than the pin 46 to allow the platform to be raised somewhat above its final working position. This permits it to be passed over the ridge 50 before being locked in position for operation. To permit introduction and removal of the platform, the slots 70 are extended through the top of the housing. After the platform has been introduced, the upper ends of the slots are closed by removable blocks 73. The blocks 73 are secured by suitable means such as screws 74. This arrangement has the advantage of permitting the platform to be subsequently removed for service if such is desired.

Figure 18:
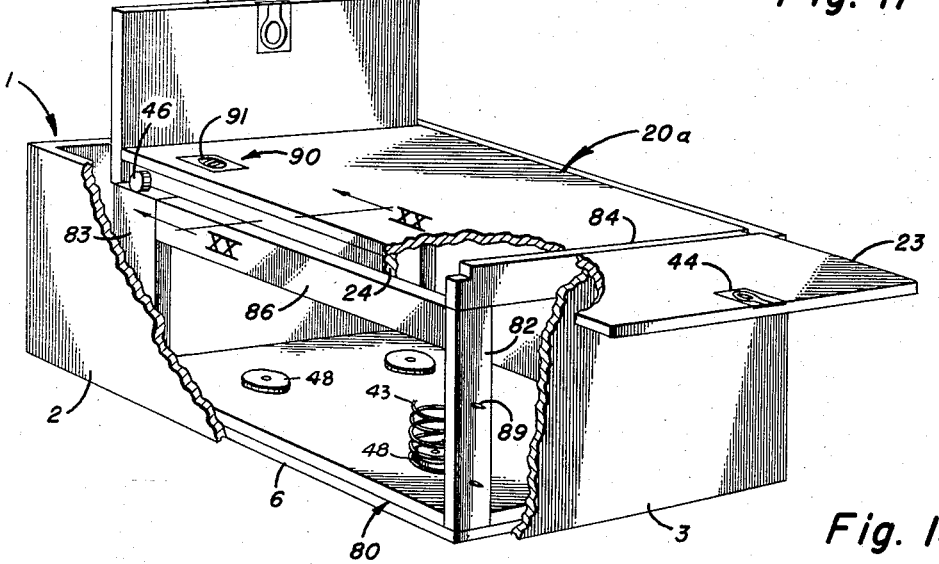
Fig. 18 is an oblique, partially broken view of the framework illustrated in Fig. 17 installed in a housing.
Figure 19:
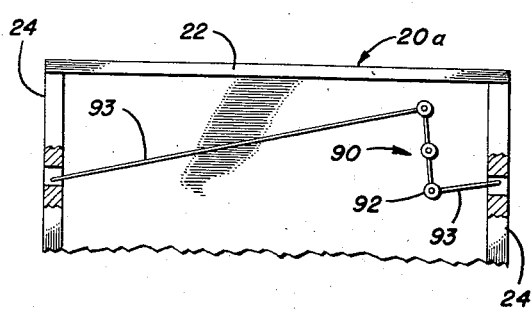
Fig. 19 is a fragmentary, partially broken bottom view of the rear portion of the platform used with the framework illustrated in Fig. 17.
Figure 20:
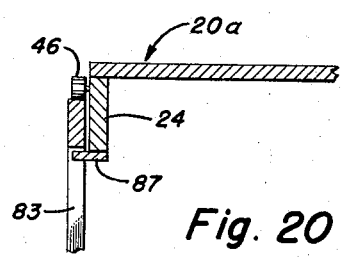
Fig. 20 is a fragmentary sectional elevation view taken along the plane XX—XX of Fig. 18.

Figs. 17, 18 and 19 illustrate an arrangement by which the platform and its necessary operating structure may be fabricated as a self contained unit ready for installation in a cabinet or a piece of furniture. In this case, the platform 20a is mounted in a chassis or skeleton framework 80 having a base 81, a pair of front posts 82 and a pair of rear posts 83. The front posts 82 are joined by a top rail 84 the top of which forms a ridge 85. The rear posts 83 are joined to the front posts by side rails 86. The rails 86 provide limit stops for the platform when engaged by the stop plates 87 (Fig. 20) mounted to the bottom of the legs 24.

The rear posts 83 are so located that the pins 46 travel vertically adjacent their rear surfaces. The height of the rear posts is such that the raised platform 20a is level when the pins 46 rest on the tops of the posts. The front and rear posts are provided with holes 88 through which the framework 80 is secured to a housing 1 by suitable means such as the screws 89 (Fig. 18). The entire framework 80 is received into the housing 1 except the ridge 85 which projects above sufficiently to seat between the platform's main portion and the leaf 23.

The platform 20a is identical to the platform 20 except for the means provided to hold down its rear portion when in storage. This consists of a rotatable latch unit 90 having a handle 91 (Fig. 18) flush with the top of the platform and a pair of wings 92 below (Fig. 19). The wings 92 are pivotally connected to laterally extending rods 93 which project through the legs 24. The rods 93 are simultaneously retracted by rotation of the handle in one direction and extended by rotation in the opposite direction. When the platform 20a is lowered to storage position, the rods 93 are extended to enter the slots 94 (Fig. 17) in the rear posts 83, thus, locking the platform in position. It will be recognized that various other mechanism accomplishing the same result may be used for this purpose.

The front end of the platform is locked down by a latch of the same construction as that illustrated in Fig. 7. The keeper plate is mounted to the inside of the top rail 84.

The construction illustrated in Figs. 17–20 makes it possible to fabricate the platform and its associated operating structure as an integrated unit of various standardized sizes. These units may then be incorporated in a piece of furniture, a kitchen cabinet or a cupboard by constructing them with a storage chamber of the correct dimensions. The basic operation of the platform is identical to that of the platform illustrated in Figs. 1, 2 and 3.

It will be recognized that a chassis or framework may readily be designed to employ the pin and slot construction illustrated in Figs. 14 and 15.

Operation

For the purpose of describing the operation of this invention, it is considered that the platform is initially in a storage position. To obtain access to the storage chamber 5, the cover 52 is first lifted. This will not permit the platform 20 to rise under the bias of the spring 43 since it is restrained by the latches 40. In this position, the platform does not touch the floor 6, a space being left to permit the platform to be further depressed.

To release the platform, the operator first grasps the handles 44 and presses the forward end of the platform down until the latch 40 is released. The front leaf 23 is then pivoted inwardly to clear the keeper plate 41. The rear of the platform is then depressed and the entire platform is shifted forwardly sufficiently to release the rear latch 40. The platform will then rise under the bias of the spring. The operator's primary duty is to guide the platform, the spring supplying most of the lifting effort even though the platform is loaded with an office instrument such as a typewriter. During the latter part of its travel, the operator gives slight assistance to the platform until it is raised sufficiently that it may be passed over the ridge 50.

As the platform rises, the pins 46 normally ride against the rear walls of the posts 45. This serves as a guide for the operator and keeps the platform properly positioned with respect to the front wall 3 of the housing.

The front leaf 23 is then pivoted downwardly until it is almost aligned with the platform's main portion 21. At this point the platform is shifted forwardly to align the opening between the leaf and platform's main portion with the ridge 50. In this forward shifting, the rear pins 46 are moved into alignment with the tops of the posts 45. The platform is then seated down over the ridge 50 and the pins seated upon the posts 45. The downward pivoting of the front leaf 23 is then completed to lock the platform firmly to the housing. This downward movement results in a clamping of the platform to the front wall of the housing, positively locking the platform against horizontal movement in any direction. Since the hinges 25 of the platform bottom on the top of the housing, the front end of the platform is positively supported against downward movement. The rear of the platform is positively supported by the engagement of the pins 46 on the posts 45.

The front leaf 23 is locked against downward movement since the tight clamping of the ridge 50 between the leaf and the main portion 21 provides a solid support for the leaf.

In this position, the platform is ready for operation. The typewriter or other instrument resting on the platform may now be moved forwardly so that at least a portion of it rests on the leaf 23. The front leaf permits the operator to sit up to the instrument with adequate leg room. Thus, the operator has comfortable access to the instrument.

When the operator has completed his work, he shifts the instrument to the center of the platform's main portion 21. He then slightly raises the leaf 23 and lifts the platform until it is free of the ridge 50. The front leaf 23 is then pivoted upwardly until it is normal to the platform and the entire platform is depressed into the storage chamber 5 until it bottoms on the floor 6. It is then shifted rearwardly and the front leaf is pivoted forwardly to effect engagement between the latches 40 and the keeper plates 41. Upon release of the platform, the spring biases it up to lock it in place.

When the lid 52 is closed, the ridge 50 is concealed and the instrument is hidden entirely within the housing. This protects the instrument against dust and possible mechanical damage. The concealment of the ridge 50 is desirable because the clamping of the platform about the ridge will, over a period of time, cause some damage to its exterior finish. This damage is not visible when the platform is raised and operating since it is hidden within the platform itself. By reason of the slot 54, it is entirely concealed when the platform is lowered and the cover 52 closed.

The modified form of this invention illustrated in Figs. 10 through 13 operates in the same manner as that illustrated in Figs. 1, 2 and 3 except that the forward and rearward length of the platforms main portion 21 is slightly less since the leaf 23a, when folded for storage, does not overlap the main portion but projects forwardly of it (Fig. 12). However, the overall length of the platform remains the same and is slightly less than the length of the storage chamber 5 to permit the horizontal shifting necessary to release the latch on the back board 22. In this arrangement, the platform, when open, entirely conceals the ridge 50a since the ridge is covered by the lap of the front leaf 23a closing the top of the notch 56. The modified hinges used in the construction, since they shift the pivot point 60 upwardly from the center line of the platform, provide a slightly more positive clamping effect about the ridge 50a. However, the principle of operation remains identical.

The modifications illustrated in Figs. 14 and 15 and Figs. 17-20 operate in the same manner as the platform illustrated in Figs. 1 through 9. In Figs. 14 and 15 the enlarged lower portion 71 of the slot 70 is required to permit the forward shifting of the platform to release the latch on the back board 22. The horizontal portion 72 at the top is necessary to permit the platform to be shifted forwardly to seat over the ridge 50 and to bring the pins 46 over a solid supporting susrface.

The construction provided by this invention assures stability in the platform, both when stored and when raised to operating position. In operating position, the platform is firmly locked to the furniture. Thus, the entire structure of the piece of furniture into which it is incorporated cooperates with the platform as a single structural unit. The result is a highly stable work table.

The operation of the unit is so simple that the time and effort required to move a typewriter from and return it to storage is reduced to a minimum. Further, everything used with the instrument can be stored in other suitable compartments in the furniture, giving it a high degree of accessibility and facility of use.

The simplicity of the various components used in this invention adapt it to inexpensive manufacture. Despite this, the invention simultaneously provides both complete storage and positive support for a typewriter or similar instrument in a single unit. It provides a complete and satisfactory solution to the storage and use of typewriters and other office equipment in the home. It also provides a unit which may be adapted to various types of furniture either especially designed as a stand for office equipment or camouflaged as furniture normally designed for an entirely different purpose.

While I have described a preferred embodiment of my invention, it will be recognized that various modifications may be made. Such of these modifications as incorporate the principles of this invention are to be considered as included in the hereinafter appended claims, unless these claims by their language expressly state otherwise.

I claim:

1. A frame having a base, a front member and side members, a platform adapted in one position to seat on top of said frame and in another to telescope downwardly into said frame; said platform having a main portion and a leaf pivotally secured to one end thereof; said leaf being movable from a first position aligned with said main portion to a second position normal to said main portion; said leaf and said main portion, when aligned, defining an opening adapted to receive the top of said front member; and element projecting from each side of said platform adjacent the other end thereof; the side members of said frame having bearing means for supporting said rigid elements when said platform is seated about said front member, said platform being horizontally movable to relocate said rigid elements rearwardly of said bearing means.

2. A combination work and storage unit comprising: a housing having a storage chamber open at the top; a platform within said chamber; said platform having a main portion and a leaf pivotally secured to one end thereof; said leaf being movable from a first position aligned with said main portion to a second position normal to said main portion; said leaf and said main portion, when aligned, defining an opening adapted to receive the top of one of the walls of said housing; an element projecting from each side of said platform adjacent the other end thereof; the side walls of said housing having bearing means for supporting said rigid elements when said platform is seated about said one wall, said platform being horizontally movable to relocate said rigid elements rearwardly of said bearing means.

3. A combination work and storage unit comprising: a housing having a storage chamber open at the top; a platform within said chamber; said platform having a main portion and a leaf pivotally secured to one end thereof; said leaf being movable from a first position aligned with said main portion to a second position normal to said main portion; said leaf and said main portion, when aligned, defining an opening through said platform adapted to receive the top of one of the walls of said housing; the top of said one wall being flush with the top of said platform when said platform is seated thereon; an element projecting from each side of said platform adjacent the other end thereof; the side walls of said housing having bearing means for supporting said rigid elements when said platform is seated about said one wall, said platform being horizontally movable to relocate said rigid elements rearwardly of said bearing means.

4. A combination work and storage unit comprising: a housing having a storage chamber open at the top; a platform within said chamber; said platform having a main portion and a leaf pivotally secured to one end thereof; said leaf being movable from a first position aligned with said main portion to a second position normal to said main portion; said leaf and said main portion, when aligned, defining an opening partially through said platform adapted to receive the top of one of the walls of said housing; an element projecting from each side of said platform adjacent the other end thereof; the side walls of said housing having bearing means for supporting said rigid elements when said platform is seated about said one wall, said platform being horizontally movable to relocate said rigid elements rearwardly of said bearing means.

5. A combination work and storage unit comprising: a housing having a storage chamber open at the top; a platform within said chamber; said platform having a main portion and a leaf pivotally secured to one end thereof; said leaf being movable from a first position aligned with said main portion to a second position normal to said main portion; said leaf and said main portion, when aligned, defining an opening adapted to receive the top of one of the walls of said housing; an element projecting from each side of said platform adjacent the other end thereof; the side walls of said housing having posts for supporting said rigid elements when said platform is seated about said one wall, said platform being horizontally movable to relocate said rigid elements rearwardly of said posts.

6. A combination work and storage unit comprising: a housing having a storage chamber open at the top; a platform within said chamber; said platform having a main portion and a leaf pivotally secured to one end thereof; said leaf being movable from a first position aligned with said main portion to a second position normal to said main portion; said leaf and said main portion, when aligned, defining an opening adapted to receive the top of one of the walls of said housing; an element projecting from each side of said platform adjacent the other end thereof; the side walls of said housing each having a channel therein for reception of one of said rigid elements; each of said channels having a horizontally extending portion adjacent its upper end; said rigid elements being vertically movable in said channels as said platform is raised and lowered in said chamber; said platform being horizontally movable to relocate said rigid elements in said horizontal portion of said channels whereby said rigid elements may bear against the lower wall of said horizontal portion.

7. A combination work and storage unit comprising: a housing having a storage chamber open at the top; a platform within said chamber; said platform being vertically movable in said storage chamber; said platform at the upper limit of its vertical travel being horizontally movable; clamping means at the forward end of said platform for securing it to the front wall of said housing when said platform is shifted forwardly to the limit of its horizontal travel; an element projecting from each side of said platform adjacent the rear end thereof; the side walls of said housing having posts for supporting said rigid elements when said platform is shifted forward for clamping to said front member; said rigid elements being rearward of said posts when said platform is at the rearward limit of its horizontal travel.

8. A combination work and storage unit comprising: a housing having a storage chamber open at the top; a platform within said chamber; said platform being vertically movable in said storage chamber; said platform at the upper limit of its vertical travel being horizontally movable; clamping means at the forward end of said platform for securing it to the front wall of said housing when said platform is shifted forwardly to the limit of its horizontal travel; interengaging means on each side of said platform and on each side of said housing adjacent the rear of said platform for supporting said platform when said clamping means is in engagement with said front wall; said interengaging means being disengaged when said platform is at the rearward limit of its horizontal travel.

9. A frame having a base, a front member and side members, a platform adapted in one position to seat on top of said frame and in another to telescope downwardly into said frame; said platform at the upper limit of its vertical travel being horizontally movable; clamping means at the forward end of said platform for securing it to the front member of said frame when said platform is shifted forwardly to the limit of its horizontal travel; a rigid element projecting from each side of said platform adjacent the rear end thereof; the side members of said frame having bearing surfaces for supporting said rigid elements when said platform is shifted forward for clamping to said front member; said rigid elements being rearward of said bearing surfaces when said platform is at the rearward limit of its horizontal travel.

10. A frame having a base, a front member and side members, a platform adapted in one position to seat on top of said frame and in another to telescope downwardly into said frame; said platform at the upper limit of its vertical travel being horizontally movable; clamping means at the forward end of said platform for securing it to the front member of said frame when said platform is shifted forwardly to the limit of its horizontal travel; interengaging means on each side of said platform and on each side of said frame adjacent the rear of said platform for supporting said platform when said clamping means is in engagement with said front members; said interengaging means being disengaged when said platform is at the rearward limit of its horizontal travel.

11. A combination work and storage unit comprising: a housing having a storage chamber open at the top; a platform within said chamber; said platform being vertically movable in said storage chamber; said platform at the upper limit of its vertical travel being horizontally movable; clamping means at the forward end of said platform for securing it to the front wall of said housing when said platform is shifted forwardly to the limit of its horizontal travel; a rigid element projecting from each side of said platform adjacent the rear end thereof; the side walls of said housing each having a channel therein for reception of one of said rigid elements; each of said channels having a horizontally extending portion adjacent its upper end; said rigid elements being vertically movable in said channels as said platform is raised and lowered in said chamber; said rigid elements bearing against the lower walls of said horizontal portion of said channels when said platform is shifted forward for clamping to said front wall.

References Cited in the file of this patent

UNITED STATES PATENTS

| | | |
|---|---|---|
| 328,475 | Ford | Oct. 20, 1885 |
| 1,093,344 | McLean | Apr. 14, 1914 |
| 2,015,518 | Fuller | Sept. 24, 1935 |
| 2,125,777 | Estrates et al. | Aug. 12, 1938 |
| 2,531,880 | Herring | Nov. 28, 1950 |